United States Patent Office 2,956,453
Patented Oct. 18, 1960

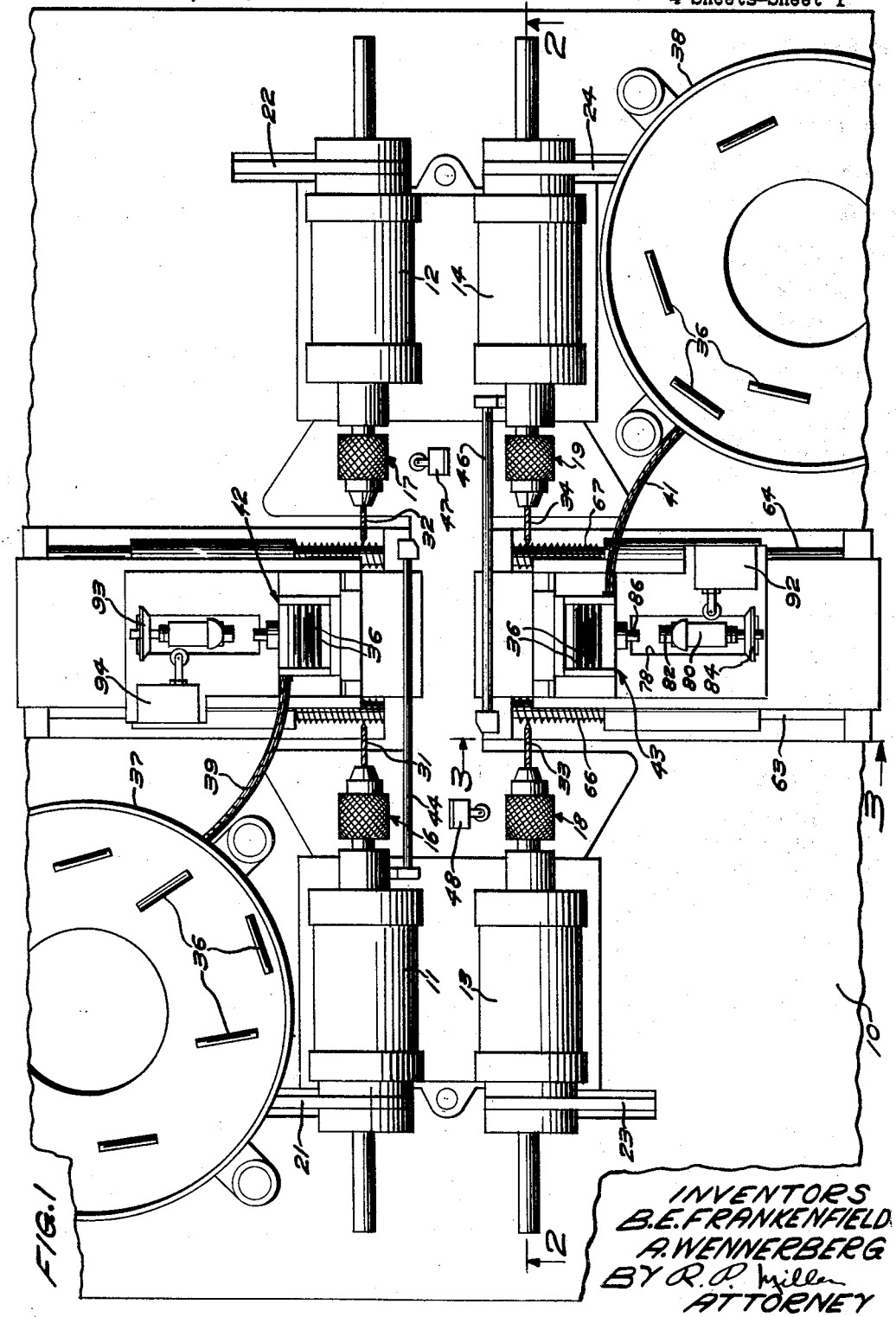

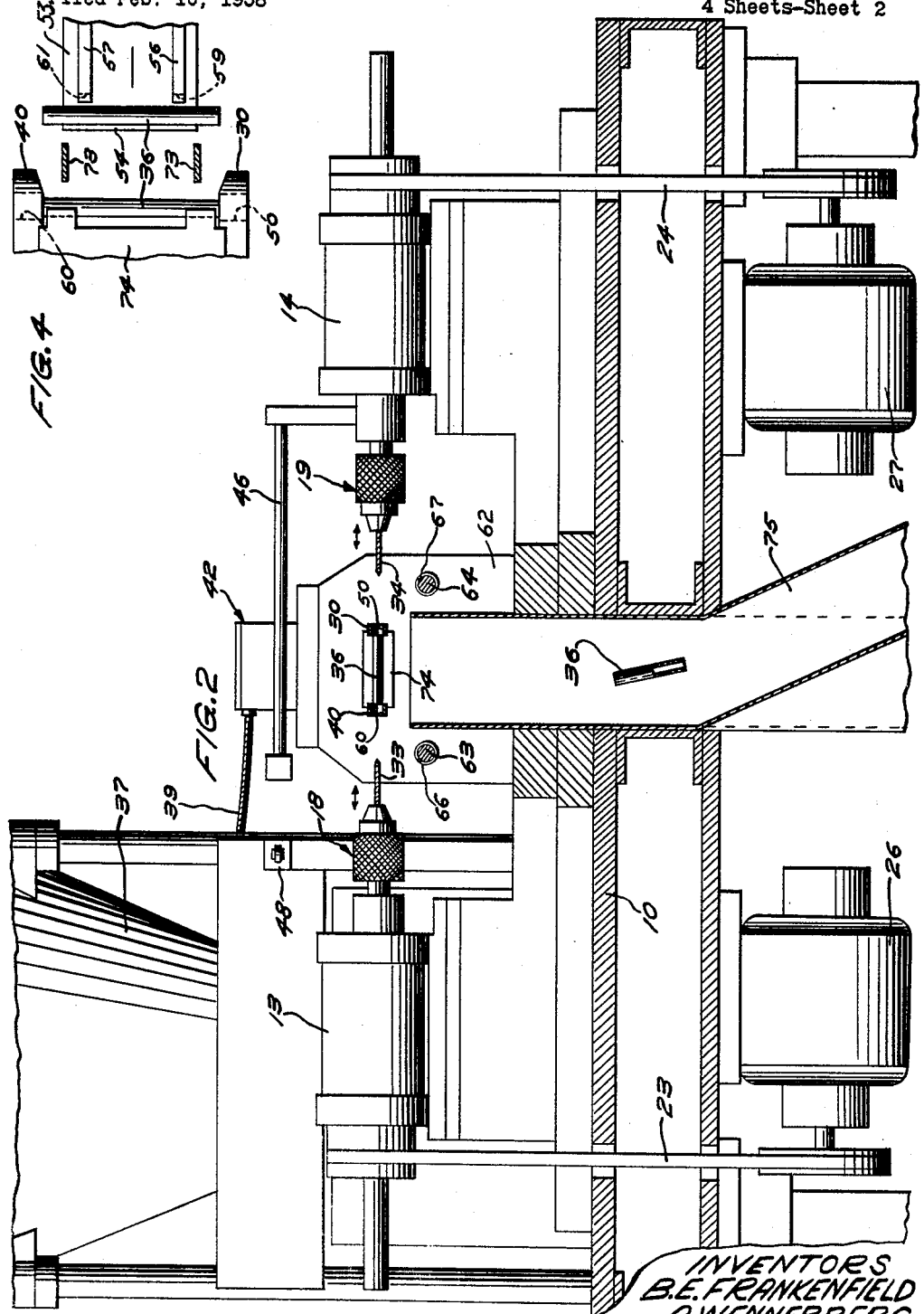

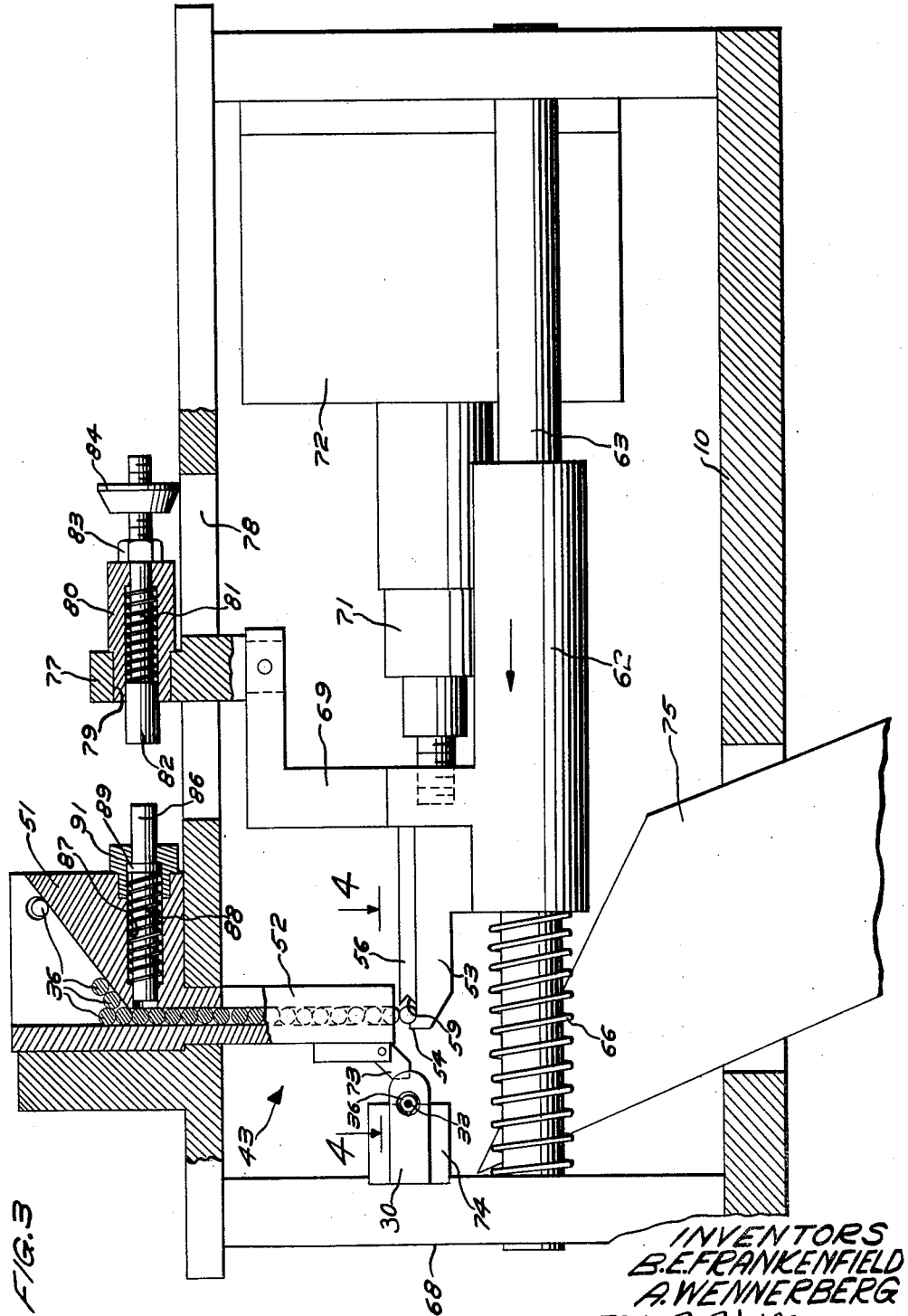

2,956,453

MULTI-SPINDLE AUTOMATIC DRILLING MACHINE

Bruce E. Frankenfield, Chicago, Ill., and August Wennerberg, Three Oaks, Mich., assignors to Western Electric Company, Incorporated, New York, N.Y., a corporation of New York Filed Feb. 10, 1958, Ser. No. 714,361

8 Claims. (Cl. 77—21)

This invention relates to an automatic drilling machine, and more particularly to a drilling machine having a pair of oppositely disposed drilling heads for operating on a single work piece that is advanced between the drilling heads by a cyclically operable feed mechanism.

In the boring of holes through a work piece where the hole is continuous and of considerable depth, it is desirable to simultaneously drill the work piece from opposite sides. During such deep bore drilling operations, it is necessary that the drills be cyclically withdrawn for purposes of cooling the drill bits and removing the cuttings and chips from the bits and the bored hole. Further, it is a requisite in such drilling operations that the movement of the drills into close proximity with each other is followed by the withdrawal of one of the drills while the other completes its drilling operation, whereafter this drill is withdrawn and the other drill is again operated to complete the drilling. In such installations in order to obtain maximum economical operation it is further required that automatic feeding and clamping facilities be provided for positioning the work pieces between the drills.

It is accordingly a principal object of the invention to provide a new and economic drilling machine having all of the aforementioned features.

Another object of the invention resides in a multi-spindle drilling machine having oppositely disposed drills together with instrumentalities for sensing the position of drills moving toward each other to accordingly stop one of each pair of moving drills while the other of said pair completes its drilling operation.

A further object of the invention is the provision of facilities in a drilling machine for cyclically withdrawing a pair of drills during a deep bore drilling operation.

An additional object of the invention is to provide an automatic work feed device for a drilling machine together with facilities for interrupting the operation of the machine upon ascertainment of an absence of work pieces.

With these and other objects in view, the present invention contemplates an automatic drilling machine having two pairs of oppositely disposed drilling spindles that are adapted to drill continuous deep bores through a pair of work pieces. Control facilities are provided to cyclically withdraw and advance the drills with respect to the drilling positions thereby providing a means for cooling the drills and discarding the cut debris. In addition a control system is provided so that when the drills move into close proximity to each other, the facilities are operated to temporarily interrupt the operation of one of the drills while the other completes the boring operation to a predetermined depth whereafter the other drill is again operated to complete the drilling operation. Upon completion of one of the drilling operations, a mechanical probing device is rendered effective to sense for the work pieces that are to be fed into the machine. If the work pieces are present and properly positioned a feed mechanism is actuated to feed another work piece into the drilling position. If the work pieces are not present or not properly positioned then the control system is actuated to interrupt further operation of the associated drills.

Though the invention is explained with respect to a drilling machine, it will be readily apparent from a consideration of the description that the invention is ideally adapted to incorporation in other metal fabricating and finishing machines, such as reamers, burnishers, millers, cutters, etc., and that the work feed mechanism is suitable to incorporation in many other diverse types of machines.

Other objects and advantages of the present invention will be apparent from the following detailed description when considered in conjunction with the accompanying drawings wherein Fig. 1 is a top plan view of a multi-spindle drilling machine incorporating the principal features of the present invention;

Fig. 2 is a side view partially in section taken along line 2—2 of Fig. 1 illustrating a pair of oppositely disposed drilling heads;

Fig. 3 is a view taken along line 3—3 of Fig. 1 that is partially cut away to illustrate a work piece feed mechanism;

Fig. 4 is a sectional view taken along line 4—4 of Fig. 3 illustrating a portion of the work piece feed and gripping mechanism.

Figure 5:
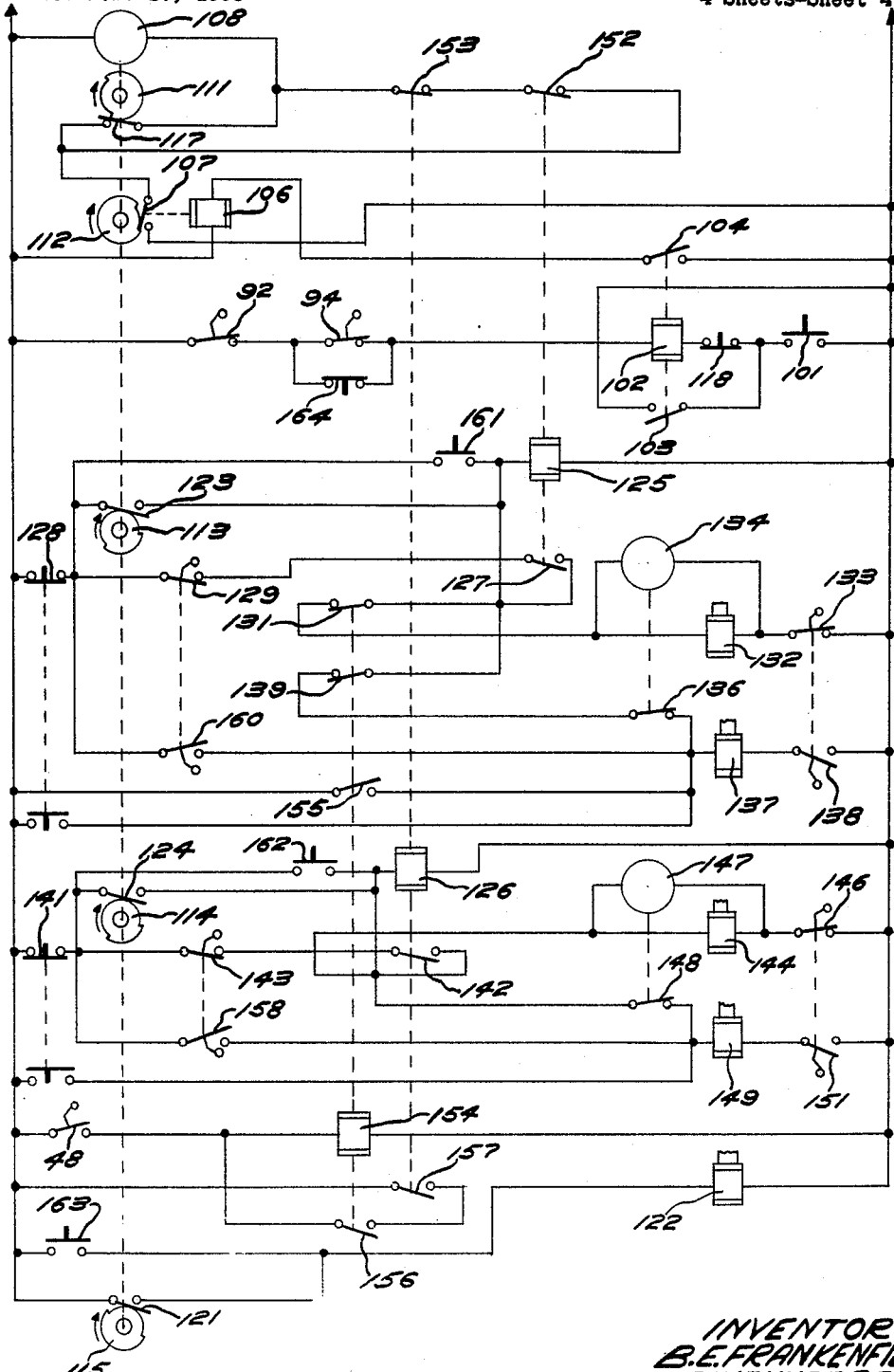
Fig. 5 is a schematic circuit diagram showing a system for controlling the machine shown in the other views.

The drilling machine shown in the drawings is designed for simultaneously drilling a pair of long holes through a pair of cylindrical work pieces by drilling from opposite ends toward the centers of the holes. Referring particularly to Figs. 1 and 2, there is shown a base 10 for supporting a series of four hydraulic cylinders 11, 12, 13 and 14 that are adapted to control the horizontal movement of a series of four drilling heads generally designated by the reference numerals 16, 17, 18 and 19. The drilling heads are adapted to be rotated by drive belts 21, 22, 23 and 24 operated by suitable electric motors only two of which are shown in Fig. 2 and designated therein by numerals 26 and 27. Oppositely disposed drill heads 16 and 17 carry directly aligned drills 31 and 32, whereas drill heads 18 and 19 carry oppositely aligned drills 33 and 34. Each pair of drills is adapted to be moved toward each other to operate on a single work piece 36 and may be of the same size or of different sizes.

The work pieces 36 are cylindrical in shape and are located in a pair of vibratory feed hoppers 37 and 38 which are of a well known commercial variety. The feed hoppers are adapted to advance the work pieces through flexible conduits 39 and 41 to a pair of cyclically operable feed mechanisms generally designated by the reference numerals 42 and 43. Upon each actuation of the feed mechanisms 42 and 43, a pair of work pieces 36 are advanced into alignment with the respective pairs of opposed drills. Control facilities are then actuated to move the pairs of drills toward each other to commence simultaneous drilling operations on each end of each work piece. The control facilities cyclically move the drills in and out of the work piece to permit the cooling of the drills and the discharge of the cut debris. The drill heads 16 and 19 have rods 44 and 46 mounted thereon. As the drills approach each other, the rods 44 and 46 will operate switches 47 and 48 to interrupt the control facilities to cause one drill of each pair to be withdrawn from further drilling operations. The other drill of each pair is permitted to continue its drilling operation until such time as a switch is operated whereupon the control facilities again allow the other drill to function and complete the drilling operation. The control facilities associated with each pair of drills are adapted to operate independently of each other.

The details of the work piece feed mechanism 43 are more particularly shown in Figs. 3 and 4 and consist of a hopper 51 for receiving the work pieces 36 from the flexible conduit 41. The work pieces fall by gravity down vertically disposed chute 52 and out onto a support 53 having a retaining lip 54 formed thereon. Mounted on the support 53 is a pair of members 56 and 57 having V-shaped gripping heads 59 and 61. Support 53 is attached to a carrier 62 that in turn is slidably mounted on a pair of guide rods 63 and 64. Springs 66 and 67 are positioned on the guide rods 63 and 64 to abut a portion of a frame member 68 and urge the carrier 62 into a righthand position. Carrier 62 has a bracket 69 secured thereto and to which is attached a piston 71 adapted to be operated by a pneumatic cylinder 72.

In operation of the feed mechanism, air is admitted to the cylinder 72 to move the piston 71, the bracket 69 and the carrier 62 toward the left whereupon the support 53 and the gripping elements 56 and 57 move to withdraw the lowermost work piece 36 from beneath the chute 52. The work piece 36 is advanced beneath a pair of pivotally mounted ejectors 73—73 into engagement with a V-notched stationary gripping jaw 74. Mounted on the jaw 74 is a pair of beveled guide members 30 and 40 having apertures 50 and 60 formed therein in lateral alignment with the drills 33 and 34. Upon completion of the drilling operation, the pneumatic cylinder 72 is again operated to withdraw the components connected thereto whereupon the retaining lip 54 withdraws the completely drilled work piece 36 from the stationary gripping jaw 74. As the support 53 moves toward the right, as viewed in Fig. 3, the ejectors 73—73 will engage and move the drilled work piece 36 over the lip 54 whereupon said work piece drops into a discharge chute 75, whereafter the part falls into a suitable receiving receptacle.

Considering now the facilities for checking for the presence or proper positioning of work pieces 36 in the chute 52 and with particular reference to Figs. 1 and 3, there is attached to the bracket 69 an elongated block 77 that is adapted to ride within a guide slot 78 formed in the upper portion of the frame of the machine. Block 77 is provided with an aperture 79 into which is placed and secured a cylinder 80 that is counterbored to receive a plunger 82 biased by a spring 81. One end of the plunger 82 is threaded to receive a lock nut 83 and a beveled switch actuator 84. It may be appreciated that the tension of the spring may be adjusted by turning the nut 83 and that the position of the switch actuator may be also varied. Positioned in alignment with the plunger 82 is a second plunger 86 adapted to project from a bore 87 formed in one wall of the hopper 51 at the junction thereof with the chute 52. A spring 88, relatively weak in comparison to spring 81, reacts on a flange 89 of the plunger 86 to urge the plunger from within the bore 87. A cap nut 91 is provided to engage the flange 89 and hold the plunger 86 within the bore 87.

In operation of the work piece sensing device, the forward movement of the carrier 62 is accompanied by a like movement of the block 77 to carry the plunger 82 into engagement with the plunger 86. The plunger 86 will then move toward the left into engagement with the work piece 36 whereupon said plunger reacts on the plunger 82 to compress the spring 81 and hold the switch actuator 84 from engagement with a switch 92. If there are no work pieces within the chute 52 or a work piece is not positioned in register with the plunger 86, then the plunger 82 moves the plunger 86 against the action of the relatively weak spring 88 into the chute 52. In such instance the plunger 82 is not moved against the relatively strong spring 81 so that the switch actuator 84 is advanced sufficiently to operate the switch 92. This switch is connected in the control circuit for the drills associated with this feed mechanism and is adapted to interrupt further functioning of these drills.

It will be understood that the feed mechanism 42 associated with the drill 31 is substantially identical as the aforedescribed feed mechanism 43. The feed mechanism 42 has associated therewith a checking mechanism for ascertaining the presence of work pieces 36 being advanced from the conduit 39 and upon ascertainment of the absence of work pieces, a beveled switch actuator 93 (corresponding to the actuator 84 previously described) will operate a switch 94 to interrupt a further cycle of operation of the drill heads 16 and 17 and the feed mechanism 42.

In order to more clearly comprehend the overall operation of the machine, attention is directed to Fig. 5 wherein there is disclosed the details of a circuit for controlling the cyclic operation of one pair of oppositely disposed drills 18 and 19 and the feed device 43 associated therewith. In order to initiate operation of the machine, a switch 101 is momentarily depressed to energize a relay 102 that functions to draw up contacts 103 to complete an obvious locking circuit. Energization of relay 102 also effectuates the drawing up of contacts 104 to complete a circuit to a timer control magnet 106. This magnet draws up contacts 107 to complete a circuit through a timer motor 108. This motor is adapted to drive a plurality of timing cams 111, 112, 113, 114 and 115. Cam 111 maintains a contactor 117 closed during a substantial portion of a cycle of rotation of the cams. Cam 112 serves to hold the contact 107 closed to insure that the cam rotates through a complete cycle of operation even though a stop switch 118 is opened.

Cam 115 closes a contactor 121 to complete a circuit to a feed solenoid 122 that controls the admission of air to the work piece feed cylinder 72. It will be recalled the operation of the cylinder 72 effectuates the advancement of a work piece 36 into position between the pair of oppositely disposed drills 18 and 19. Further rotation of the timer motor 108 causes the cams 113 and 114 to close contactors 123 and 124 to complete energizing circuits for a pair of relays 125 and 126. Energization of relay 125 draws up contacts 127 to complete a circuit through a control switch 128, through a drilling depth limit switch 129, through the now drawn up contacts 127, through normally closed contacts 131, through a solenoid 132 and through a limit switch 133 that is closed when the drill head 19 is in the withdrawn position. Energization of solenoid 132 admits air to the pneumatic cylinder 14 to move the drill head 19 toward the now positioned work piece 36. Completion of this circuit also applies a momentary energizing pulse to a timer 134 of a well known type that functions immediately to draw up contacts 136. Timer 134 is of the type that is designed to complete a cycle of operation even though the initiating circuit is interrupted. As the head 19 moves toward the work piece 36, the limit switch 133 opens to deenergize solenoid 132 but air will be continued to be admitted to the cylinder 14 until such time as the valving mechanism associated therewith is reversed by the operation of a solenoid 137.

When the limit switch 133 opened, a second set of contacts 138 associated therewith are closed, thus, when the timer 134 completes its cycle of operation, the contacts 136 close to complete an energizing circuit for the solenoid 137 which may be traced from the switch 128 through the switch 129, through now closed contacts 127 through normally closed contacts 139, through now closed contacts 136, through the solenoid 137 and the now closed contacts 138 of the limit switch 133. Energization of solenoid 137 results in a reversal of the valving mechanism associated with the cylinder 14 so that the cylinder now functions to withdraw the head 19 toward the right. As soon as the head 19 is restored to the initial position, the limit switch 133 is again closed to operate the solenoid 132 and the contacts 138 are again open to deenergize the solenoid 137. The head 19 will now again advance toward the work piece 36. This cyclic operation of the head 19 continues until the drilling operation is completed and is a desirable feature of the invention in that it provides for the cooling of the drill bit 34 and the withdrawal of the cuttings from the bored hole in the work piece 36.

A similar control circuit is associated with the drill head 18 and is initiated into operation by the closure of the contactor 124 to complete a circuit, through a switch 141, through the now closed contactor 124 and through the windings of a relay 126. Energization of relay 126 draws up contacts 142 to complete an energizing circuit from the closed switch 141, through a normally closed drilling depth limit switch 143, through the now closed contacts 142, through a solenoid 144 and through a limit switch 146. Energization of solenoid 144 controls the valving mechanism associated with the cylinder 13 and permits the cylinder to advance the head 18 toward the right and into the drilling position. Energization of solenoid 144 is also accompanied by the energization of a timer 147 that is identical to the timer 134. Timer 147 immediately draws up contacts 148 to preclude the energization of a withdrawing solenoid 149. As the head 18 moves toward the right, the limit switch 146 is opened and a second set of contacts 151 associated therewith are closed. When the timer 147 times out, the contacts 148 are again closed to complete an energizing circuit for the solenoid 149 that functions to reverse the valving mechanism associated with the cylinder 13 whereupon the head 18 is withdrawn from the drilling position.

When the relays 125 and 126 are operated, contacts 152 and 153 are open and when the cam 111 opens the contactor 117 the circuit for the timer motor 108 is interrupted, thus the cams 111—115 are precluded from further operation during the cyclic operation of the drill heads 18 and 19.

As the cyclic drilling operation continues, the drill head 19 moves the rod 46 progressively closer to the limit switch 48 until such time as the drills 33 and 34 move into close proximity to each other so that further simultaneous drilling operations might result in the damage of the drills whereafter the switch 48 is closed to energize a relay 154. Energization of relay 154 draws up contacts 131 and 139 to interrupt further operation of the solenoids 132 and 137 which are associated with the drill head 19. Energization of relay 154 draws up contacts 155 to complete an energizing circuit for the solenoid 137 which energizes to withdraw the head 19 from the drilling position. Energization of relay 154 also draws up contacts 156 to complete a locking circuit through now drawn up contacts 157 associated with the relay 126. Energization of relay 154 does not interfere with the cyclic operation of the solenoids 144 and 149; consequently, the drill head 18 continues to cyclically operate. Eventually the drill head 18 moves a sufficient distance to open the limit switch 143 whereupon the relay 126 is deenergized to preclude further operation of the solenoid 144. The limit switch 143 is positioned to be engaged after the drill head 18 has moved a sufficient distance to drill slightly beyond the center of the work piece. The opening of limit switch 143 is accompanied by a closure of a second pair of contacts 158 associated therewith to complete an energizing circuit for the solenoid 149 that functions to withdraw the drilling head 18 to the initial rest position. Deenergization of relay 126 is also accompanied by the release of the contacts 157 to interrupt the locking circuit for the relay 154. This relay deenergizes to permit the contacts 131 and 139 to again close whereupon the solenoids 132 and 137 are cyclically operated to permit the drill head 19 to complete the drilling operation. Drill head 19 continues to advance until such time as the limit switch 129 is open whereupon the relay 125 is deenergized to preclude further operation of the solenoid 132. The opening of the limit switch 129 is accompanied by the closure of contacts 160 to complete an energizing circuit for the solenoid 137. Solenoid 137 again functions to withdraw the drill head to the initial position.

Deenergization of the relays 125 and 126 permits the contacts 152 and 153 to again close whereupon the energizing circuit for the timer motor 108 is again complete. Cams 111—115 now complete the cycle of rotation and automatically initiate another cycle of operation of the machine.

The switches 128 and 141 are provided to selectively stop the respective drill heads 18 and 19. Control switches 161 and 162 are provided to allow for the selective manual operation of either drill head. Manual switch 163 is provided to allow for the selective operation of the solenoid 122 which will feed another work piece 36 into the drilling position.

Another control circuit identical with that shown in Fig. 5 is associated with the drill heads 16 and 17 so that these drill heads will cyclically operate in the manner described with respect to the drill heads 18 and 19. Switch 92 is included in the energizing circuit for the relay 102; consequently, it will be appreciated that if the feed mechanism 43 is empty of work pieces 36 then the switch 92 is opened to deenergize the relay 102 whereupon further operation of the feed mechanism 42 and drill heads 18 and 19 is precluded. Contacts of switch 94 associated with the feed device 42 can also be selectively included in the control associated with the feed device 43 by opening a push button 164.

It is to be understood that the above described arrangements of apparatus and construction of elemental parts are simply illustrative of an application of the principles of the invention and many other modifications may be made without departing from the invention.

What is claimed is:

1. An automatic fabricating machine having a pair of oppositely disposed cutting heads for operating on a work piece positioned therebetween, which comprises a work piece carrier for holding a work piece, said carrier having a work piece gripping jaw and retaining lip, means for advancing the carrier to move a work piece between said cutting heads, an ejector in the path of the work piece for forcing the work piece past the retaining lip, means for periodically moving said cutting heads toward and away from the positioned work piece to progressively cut deeper into said work piece, first means operated by a predetermined movement of a first of said cutting heads for interrupting further movement of the second cutting head, second means actuated by a further predetermined advance of said first cutting head for interrupting further movement of said head and reinitiating movement of said second cutting head, third means operated by a further predetermined advance of said second cutting head for interrupting further advance of said second head, and means operated by said third interrupting means for moving the carrier away from the cutting heads.

2. In an automatic fabricating machine having a cutting tool, a chute for storing work pieces, a carrier for receiving single work pieces from the chute, means for advancing the carrier to move the work piece from the chute to a position in register with the cutting tool, a sensing probe operated by the advance of the carrier for ascertaining the absence of work pieces in the chute, means for moving the cutting tool in position to cut the positioned work piece, means operated by a predetermined movement of the tool for returning the carrier to the chute, and means operated by the sensing means when there is an absence of work pieces in the chute for interrupting further operation of said carrier advancing means and said tool moving means.

3. In a cutting machine having a pair of oppositely disposed cutting tools adapted to be moved toward each other, means for cyclically moving said tools toward and away from each other, a work piece feeding chute for storing work pieces and dispensing them separately, a work piece advancing means actuated by the completion of movement of said tools away from each other for advancing a work piece from the dispensing chute to a position between said cutting tools, sensing means for ascertaining the absence of work pieces in the chute, means carried by the work piece advancing means for moving said sensing means into a work piece ascertaining position, and means actuated by the sensing means ascertaining the absence of a work piece for interrupting the further operation of said tool moving means.

4. An automatic fabricating machine having a cutting tool, a chute for storing work pieces, a probe mounted to move through the chute to ascertain the absence of work pieces, a spring for biasing the probe from the chute upon engagement with a work piece, a carrier means for singularly advancing the work pieces from the chute to a position in register with said tool, a plunger mounted on the carrier for movement with the carrier into engagement with said probe to urge said probe into said chute, a spring urging said plunger toward said probe, said plunger spring being stronger than said biasing spring, means for advancing said tool toward a work piece positioned in register therewith, means operated by a predetermined advance of said tool for restoring the carrier to the initial position, and means operated by the probe moving into the chute in the absence of a work piece therein for interrupting operation of said carrier advancing means and said tool advancing means.

5. In a machine having a movably mounted cutting tool, means for cyclically advancing the tool toward and away from a work piece positioned in register therewith, a movable support for holding a work piece, a fixed clamp, a clamp mounted on said support, means for advancing the support to grip a work piece positioned on said support between said clamps, a control means for cyclically advancing and withdrawing said tool and for advancing said support after said tool has been withdrawn, a storage means for holding work pieces and cooperable with said support to permit said clamp on said support to advance the work pieces one at a time, means operable by said moving support for sensing the absence of work pieces in said storage means, and means operable by the sensing means ascertaining the absence of work pieces for interrupting operation of the control means.

6. An automatic fabricating machine having a pair of spaced cutting heads for operating on a work piece positioned therebetween, which comprises a first fixed gripping jaw, a work piece carrier having a second gripping jaw mounted thereon, said carrier having a retaining lip to hold the work piece thereon against a predetermined lateral force, a chute for dispensing work pieces on said carrier, means for advancing said carrier toward said cutting heads for moving said second jaw to advance a work piece from said chute into engagement with said first fixed jaw, means for cyclically moving said cutting head toward and away from a work piece held by said jaws to intermittently cut progressively deeper into the gripped work piece, means operated by a predetermined advance of both said cutting heads for moving said carrier from said cutting heads, and an ejector in the path of the work piece for forcing the work piece from the carrier against the holding force of the retaining lip as said carrier is moved from the cutting head.

7. In an automatic drilling machine of the type wherein a pair of opposed aligned drills carried by drill heads operate from opposite sides of a work piece to drill a single hole therethrough, and wherein means are provided for reciprocating the drill heads into and out of the work piece; an improved control mechanism, which comprises a first control circuit for causing cyclic reciprocation of a first drill head, a second control circuit for causing cyclic reciprocation of the second drill head, a starting switch designed for activating both control circuits so that both drills cyclically advance into and retract out of engagement with the work piece to cut progressively deeper into the work piece, a first control switch designed for deactivating said second control circuit, a switch actuator carried by the first drill head and designed for operating said first control switch to stop the reciprocation of the second drill head when the first drill has cut to a predetermined distance short of the center of the work piece, a second control switch designed for deactivating said first control circuit and for reactivating said second control circuit when the first drill has reached approximately the midpoint of the work piece, whereupon the first drill head ceases operation and the second drill head again functions to complete the drilling operation.

8. In a machine having a tool designed for engaging and performing an operation on a work piece; an improved feeding device for the work pieces, which comprises a first fixed gripping jaw, a work piece carrier having a second gripping jaw mounted thereon, said carrier having a retaining lip to hold the work piece thereon against a predetermined lateral force, a chute for dispensing work pieces on said carrier, means for advancing said carrier toward the tool for moving said second jaw to advance a work piece from said chute into engagement with said first fixed jaw, at which time the work piece is clamped in position for operation thereon by the tool, means operated after completion of the operation by the tool for moving said carrier away from the tool and said fixed gripping jaw, and an ejector in the path of the work piece for forcing the work piece from the carrier against the holding force of the retaining lip as said carrier is moved away from said fixed gripping jaw.

References Cited in the file of this patent

UNITED STATES PATENTS

| | | |
|---|---|---|
| 1,575,308 | Alger et al. | Mar. 2, 1926 |
| 1,904,975 | Babcock | Apr. 18, 1933 |
| 1,951,093 | Johnston | Mar. 13, 1934 |
| 2,049,444 | Hirvonen | Aug. 4, 1936 |
| 2,499,564 | Binsack | Mar. 7, 1950 |
| 2,578,454 | Saives | Dec. 11, 1951 |
| 2,622,488 | Payne | Dec. 23, 1952 |
| 2,623,620 | Calkins | Dec. 30, 1952 |
| 2,654,270 | Adcock | Oct. 6, 1953 |
| 2,809,541 | Witt | Oct. 15, 1957 |